(12) United States Patent
Corner et al.

(10) Patent No.: US 6,821,369 B2
(45) Date of Patent: Nov. 23, 2004

(54) SINGLE-STAGE METHOD OF FABRICATING RADIAL TIRE WITH BREAKER PLY EXTENDING BETWEEN BEAD REGIONS

(75) Inventors: Michael Raymond Corner, Coundon (GB); David Robert Watkins, Sutton Coldfield (GB)

(73) Assignee: Sumitomo Rubber Industries, Ltd., Kobe (JP)

(*) Notice: Subject to any disclaimer, the term of this patent is extended or adjusted under 35 U.S.C. 154(b) by 299 days.

(21) Appl. No.: 09/974,876

(22) Filed: Oct. 12, 2001

(65) Prior Publication Data

US 2002/0066510 A1 Jun. 6, 2002

Related U.S. Application Data

(62) Division of application No. 09/112,313, filed on Jul. 9, 1998, now Pat. No. 6,318,429.

(30) Foreign Application Priority Data

Jul. 12, 1997 (GB) .............................................. 9714609

(51) Int. Cl.[7] .......................... B29D 30/22; B29D 30/36; B60C 9/07; B60C 9/08
(52) U.S. Cl. .................... 156/130.7; 152/560; 152/562; 156/133
(58) Field of Search ................................ 152/560–562; 156/128.1, 130, 130.7, 133

(56) References Cited

U.S. PATENT DOCUMENTS

| | | | | |
|---|---|---|---|---|
| 3,327,753 A | * | 6/1967 | Travers ................... 152/562 X |
| 3,373,066 A | * | 3/1968 | Hindin ........................ 156/133 |
| 3,486,546 A | * | 12/1969 | Sidles et al. ............. 152/561 X |
| 3,525,654 A | * | 8/1970 | Uotani et al. ........... 156/133 X |
| 3,525,655 A | * | 8/1970 | Wood et al. ............. 156/133 X |
| 3,730,246 A | | 5/1973 | Sidles et al. |
| 3,756,883 A | * | 9/1973 | Gay ........................ 156/133 X |
| 3,861,440 A | | 1/1975 | Ochiai et al. |
| 3,901,751 A | * | 8/1975 | Wilson ........................ 156/133 |
| 3,916,969 A | * | 11/1975 | Auerbach et al. ....... 156/133 X |
| 5,630,893 A | | 5/1997 | Williams et al. |

FOREIGN PATENT DOCUMENTS

| | | |
|---|---|---|
| EP | 0595653 A | 5/1994 |
| EP | 0658450 | 6/1995 |
| EP | 0668172 A | 8/1995 |
| GB | 1569640 | 6/1980 |
| JP | 58073405 | 5/1983 |
| JP | 58093605 | 6/1983 |

* cited by examiner

Primary Examiner—Adrienne C. Johnstone
(74) Attorney, Agent, or Firm—Birch, Stewart, Kolasch & Birch, LLP

(57) ABSTRACT

An improved single-stage method for building a tire includes the steps of forming a cylindrical-shaped carcass with axially extending carcass reinforcing cords, fitting annular bead hoops onto the radially outer surface of the carcass ply at positions axially inward of each of the carcass ply edges, assembling a plurality of breaker plies, including one wide breaker ply, centrally onto and about the radially outer surface of the carcass ply, and fitting onto this cylindrical assembly the remaining components of the tire to form a cylindrical green tire assembly, wherein the radial bias angle of the carcass reinforcing cords in the vulcanized tire changes progressively from 90° in the regions of the bead hoops to as low as 70° in the central crown region.

9 Claims, 4 Drawing Sheets

US 6,821,369 B2

SINGLE-STAGE METHOD OF FABRICATING RADIAL TIRE WITH BREAKER PLY EXTENDING BETWEEN BEAD REGIONS

This application is a divisional of application Ser. No. 09/112,313, filed on Jul. 9, 1998, now U.S. Pat. No. 6,318,429, the entire contents of which are hereby incorporated by reference and for which priority is claimed under 35 U.S.C. § 120.

BACKGROUND OF THE INVENTION

1. Field of the Invention

The present invention relates to pneumatic tires having a radial carcass structure and particularly to such tires having ground contacting tread regions which are substantially curved in axial cross-section. The invention also relates to improvements in the manufacture of such radial tires.

2. Description of Related Art

Radial motorcycle tires are one such type of tire having a highly curved tread. These tires have relatively short sidewalls extending radially and axially outward from beads with the maximum tire width being located between the edges of the tread region. The highly curved tread allows the contact area between the tire and the road surface to be maintained as the motorcycle is banked over for cornering.

In addition to tires for motorcycles there has recently been proposed in co-pending European Patent Application 94309359.1, published as EP-0658450, a radial tire for a passenger car. Unlike conventional flat-treaded car tires this new tire has a tread region having substantial curvature in transverse cross-section. In straight-ahead running the contact area between the tire tread and the road is relatively narrow in comparison to that of the conventional tire. In tests this new tire has shown improved characteristics which are believed to be due in part to the ability of the contact area to move across the tread and/or increase in axial width in response to changes in load and in cornering.

In common with conventional flat-tread radial tires the above-described highly curved treaded tires have their ground contacting tread regions reinforced by a breaker or belt which extends circumferentially around the tire radially outward and adjacent to the tire carcass. Conventionally such breakers comprise plural plies of tire fabric reinforced by parallel cords disposed at an angle to the circumferential direction, the cords of one ply being crossed with respect to the cords of an adjacent ply.

A common problem with such belted tires and particularly with curved treaded tires is so called breaker edge looseness wherein the bond between the cord reinforcement and its surrounding rubber breaks down at the edge of the breaker leading to premature failure of the tire.

It is therefore a first object of the present invention to improve the properties of radial tires of the abovementioned highly curved tread type including improving the resistance to breaker edge looseness.

Radial tire manufacture has conventionally employed a two-stage process. In the first-stage a cylindrical tire carcass is built on the cylindrical surface of a drum, the body comprising an assembly of inner liner and one or more carcass plies anchored to and interconnecting axially spaced apart annular bead cores or hoops. On completion of the first stage assembly the cylindrical carcass is removed from the drum and transferred to a second-stage machine. In the second stage of manufacture the shape of the carcass is changed from cylindrical to toroidal and then the individual breaker plies are applied sequentially to the crown of the toroid followed finally by the rubber tread strips. Such a two-stage manufacturing operation is expensive in respect of equipment, factory space, labor and time.

Single-stage manufacture of radial tires has been proposed previously. For example GB 1 569 640 discloses the single-stage assembly of a conventional flat-treaded radial tire having an additional zero degree cap band overlaying the breaker or belt. However the single-stage or so-called 'flat building' of a radial tire assembly necessitates a considerable increase in the circumferential length of the breaker plies when the shape of the final assembly is changed from cylindrical to toroidal. This increase in circumferential length of the breaker plies is accomplished by a complex combination of stretching of the plies and trellising of the cords. In the prior art it has been found that due to the adhesion of the breaker cords to other components of the assembly, the complex movement of the breaker plies has resulted in uncontrollable and uneven movement of the cords, distortion of the carcass ply and consequent malformation of the tire. For this reason the single-stage manufacture of a radial tire has not been adopted.

It is therefore another object of the invention to provide an improved single-stage method by which such an improved radial may be efficiently built.

BRIEF SUMMARY OF THE INVENTION

According to one aspect of the invention a tire comprises a tread reinforced by a breaker assembly comprising at least two breaker plies and having in its normally inflated fitted condition a camber value C/L of between 0.3 and 0.7, a reinforcing carcass ply of cords disposed at an angle of 0° to 20° to the tire radial plane extending radially inside the breaker and between two bead regions to form a carcass main portion and wrapped in each bead region axially outwardly around an annular bead core to form carcass ply turn-up portions extending radially outwardly and terminating radially inward of the point of maximum tire width, characterized in that one breaker ply extends between the two bead regions having its edges disposed between the carcass main portion and the respective turn-up portion in the bead region.

By camber value is meant the ratio C/L between the radial distance C from the center to the edge of the tire tread and the axial distance L between the center and edge of the tread.

By normally inflated and fitted state is meant the state which the tire is mounted on its recommended wherein and inflated to its scheduled pressure.

According to another aspect of the invention a method of building a radial tire comprises forming a cylindrical-shaped carcass comprising axially extending carcass reinforcing cords, fitting annular bead hoops onto the radially outer surface of the carcass ply and axially inward of each of the ply edges, assembling a plurality of breaker plies centrally onto the radially outer surface of the carcass ply and co-cylindrically with it including one wide breaker ply which extends axially to a position inward and adjacent to each of the bead hoops, turning each of the carcass ply edge portions lying axially outwardly of the bead hoops radially outwardly and axially inwardly around the bead hoops to overlie the axial edges of the wide breaker ply, assembling onto the cylindrical assembly of carcass, beads and breaker, the remaining components of the tire such as a centrally disposed rubber tread flanked at either side by rubber sidewalls to form a cylindrical green tire assembly, shaping the resultant cylindrical green tire assembly into a toroid and finally molding in a heated tire mould to form the tread pattern in the tread and vulcanize the whole assembly.

BRIEF DESCRIPION OF THE DRAWINGS

Further aspects of the present invention will become apparent from the following description by way of example only of embodiments of the invention in conjunction with the following diagrams in which.

Figure 1:
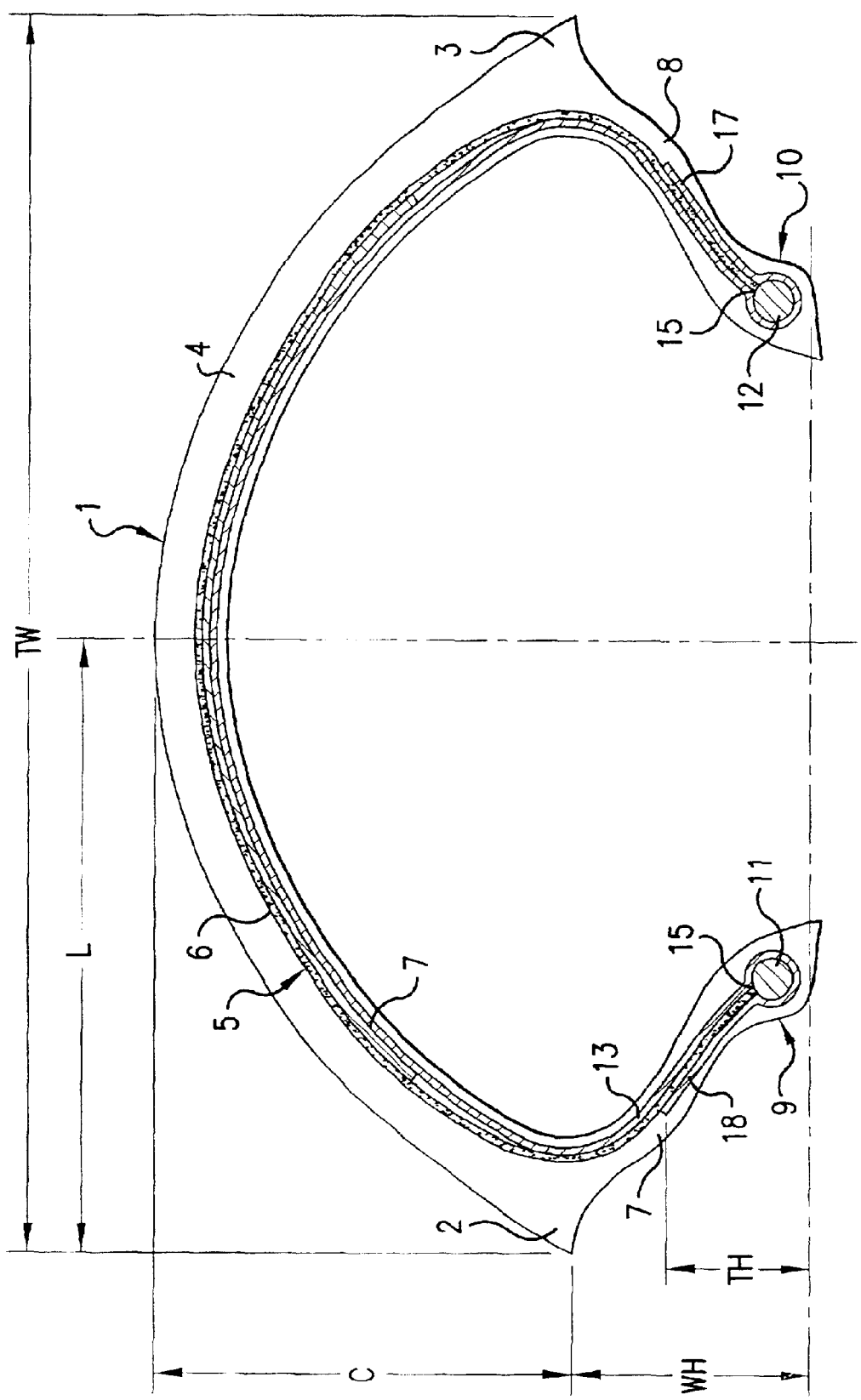
FIG. 1 shows an axial cross-section of a tire according to the first embodiment of the invention.

Shown in FIG. 1 is a motorcycle tire comprising a convex tread region 1 extending between tread edges 2,3, connected to sidewalls 7,8 and terminating in bead regions 9,10. Each bead region is reinforced by an inextensible annular bead core 11,12.

The tire when normally E ted has a camber value C/L defined as the ratio of 0.5 to 0.7, for example, the radial distance C and the axial distance L between the tread center and the tread edge, of 0.6.

Extending through the tread region 1, radially inward of the tread rubber 4, and between the bead regions is a main carcass ply 13. In each bead region the main carcass ply is anchored by being turned around the respective bead core from the axially inside to outside to form carcass ply turn-ups 17 and 18. These ply turns-ups 17,18 extend to a radial height TH lower than the height WH of the maximum tire width TW.

In this embodiment the carcass ply 13 comprises a single ply of tire fabric comprising rubber covered nylon cords disposed radially at an angle of between 70° and 90° to the tire circumferential direction.

The tread region 1 is reinforced by a breaker assembly disposed radially between the tread rubber 4 and the main carcass ply 13.

The breaker assembly 5 comprises two breaker plies, a radially inner narrow ply 7 and an outer ply 6 which extends beyond the tread edges through the sidewalls 7,8 and into the bead regions 9, 10. The radially inner end portions of the outer breaker ply 6 are disposed between the carcass main ply 13 and the carcass ply turn-ups 17,18 and the breaker ply ends 15 are adjacent to the bead core 11,12.

Both breaker plies 6 and 7 comprise rubber covered cords of 15° to 30°, for example, aromatic polyamide (aramid). The cords of the inner narrow ply 7 and those of the outer ply 6 in the central region are disposed at an angle of 20° to the tire circumferential direction and crossed with respect to each other.

Figure 3C:
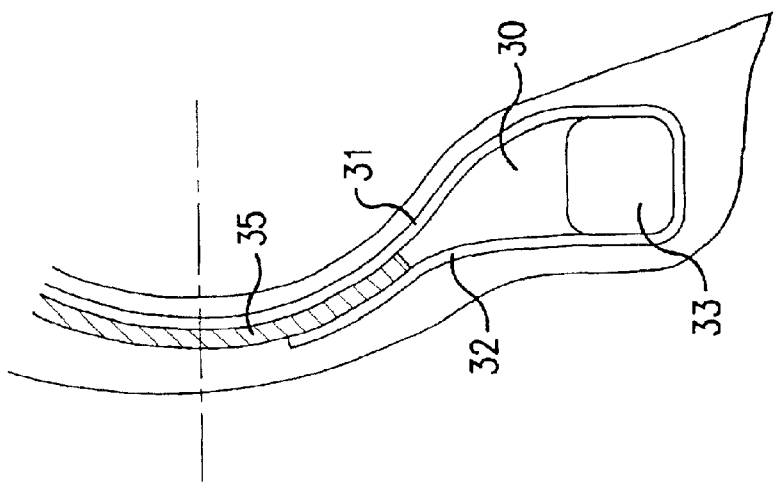
FIG. 3 shows three variants of the configuration of a tire bead region according to the invention.
Figure 3B:
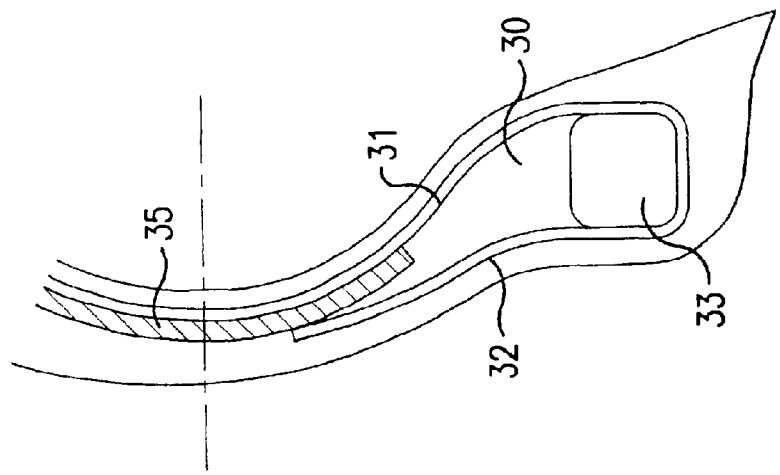
Figure 3A:
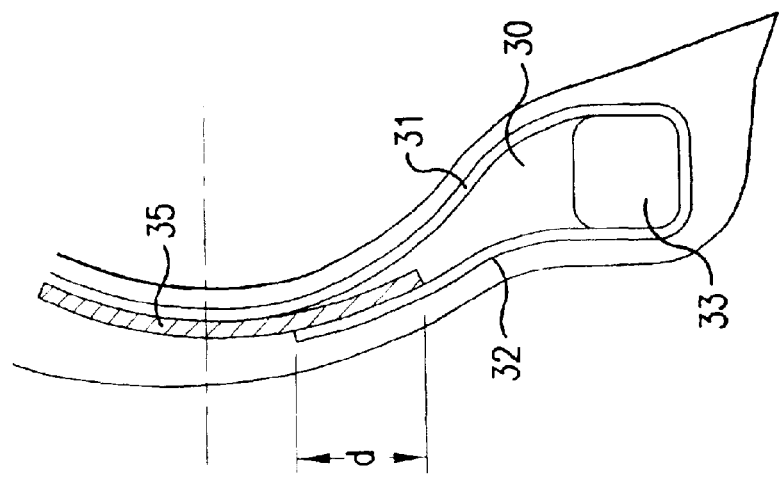

The tire of FIG. 1 has no conventional rubber apex member in the bead. However in accordance with the invention an apex may be provided and shown in FIG. 3 are three different configurations of bead. In FIG. 3a a triangular-section apex 30 is provided on the bead coil 33 and between the carcass main portion 31 and the turn-up portion 32. The wide breaker ply 35 has its edge region disposed between the carcass turn-up 32 and the radially outer end of the apex 30. FIG. 3b shows the edge of the breaker disposed between the apex and the carcass main portion whilst FIG. 3c shows the apex wholly radially inward of the breaker edge.

The edge portions of the wide breaker preferably overlie or overlap the carcass turn-up or the apex by a distance d of not less than 0.5 mm.

Figure 2:
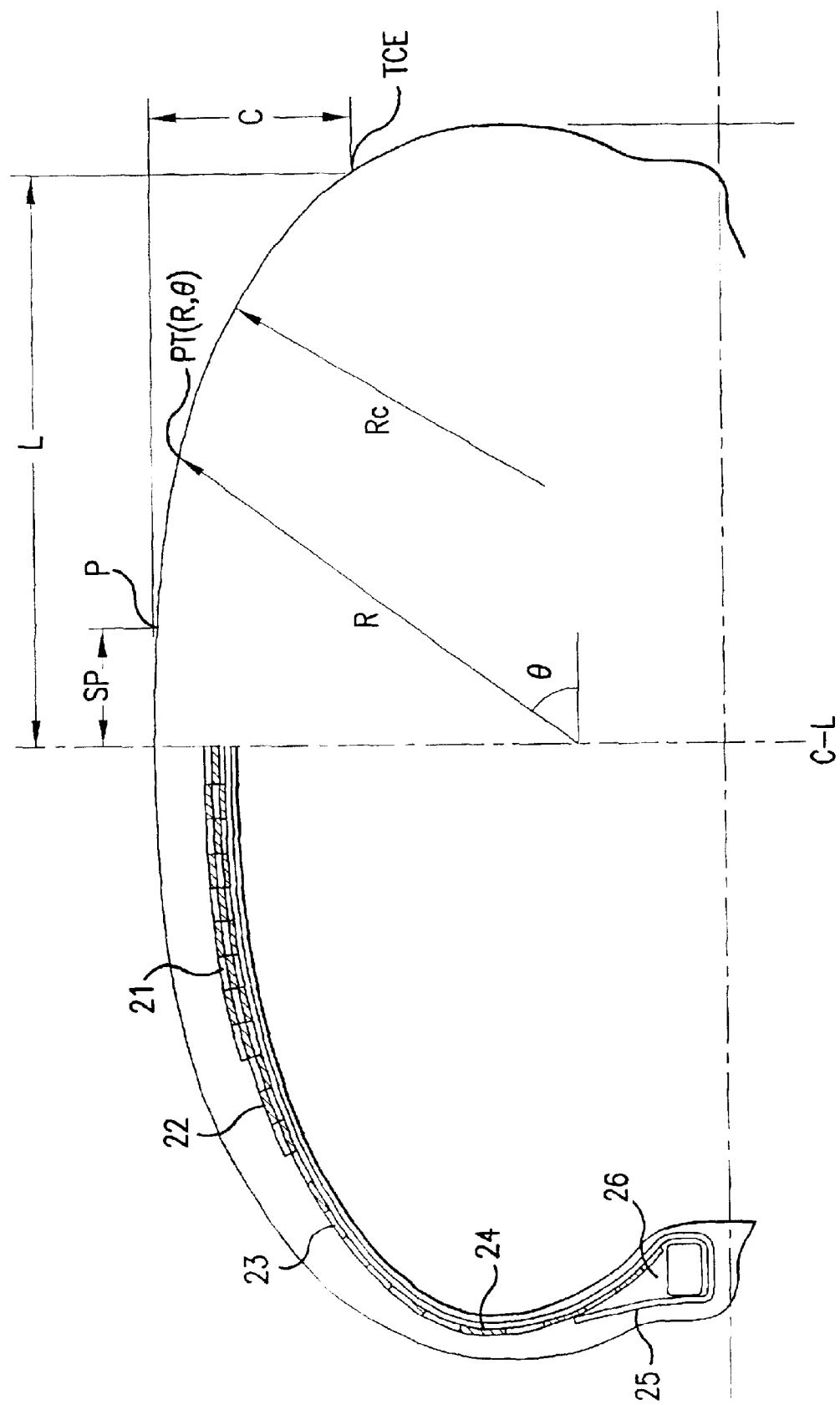
FIG. 2 shows an axial split cross-section of a second embodiment, the left-half showing the tire construction and the right-halt showing details of the tread surface curvature.

Shown in FIG. 2 is another embodiment of the invention. The tire construction, shown on the left-hand half of FIG. 2, has three breaker plies 21,22 and 23, the radially innermost 23 being the widest and extending radially inward into the bead and terminating between the carcass main portion 24 and the carcass turn-up 25. The tire bead also has an apex 26.

Each of three breaker plies 21, 22 and 23 comprises aramid cords. The cords of plies 21 and 22 are disposed at an angle of 20° to the tire circumferential direction. The cords of ply 23 are disposed at an angle of 38° in the central crown portion, and the cords of each of the three plies are crossed with respect to adjacent plies.

The tire has no tread edge in the conventional sense. However the camber value C/L of the tire can be defined as the ratio of the radial and axial distances C and L between the tread contact edge point TCE and the maximum tire diameter at the tread centerline. In this embodiment the camber value is 0.36.

The right and half of FIG. 2 shows details of the curvature of the outer surface of the tire. When normally fitted the tire outer surface has a continuously decreasing radius of curvature Rc from the point P to the tread contact edge TCE where the point P is at a distance of SP from the tire circumferential centerline C/L equal to 20% of the distance L from the tread centerline C/L to the tread contact edge TCE.

Furthermore the tread surface of the tire of FIG. 2 axially outward of point P is a curve lying within two curves defined by the locus of a point with polar co-ordinates R' ζ where R'=R±4%R wherein $$R=(92.4630+50.02951\times\theta-109.1216\times\theta^2=43.74487\times\theta^3+7.385639\times\theta^4-4.776894\times\theta^{5)}\times(SW/194)$$

The tires of the present invention may be preferably manufactured using a single-stage assembly process.

Such a single-stage manufacturing process will now be described with reference to the series of sequential schematic diagrams of FIG. 4 which depict the upper section of the right-hand side of a cylindrical green tire in the various stages of assembly.

Figure 4A:
FIGS. 4a to 4g are schematic diagrams showing the sequence of building of the tire of FIG. 1.
Figure 4B:
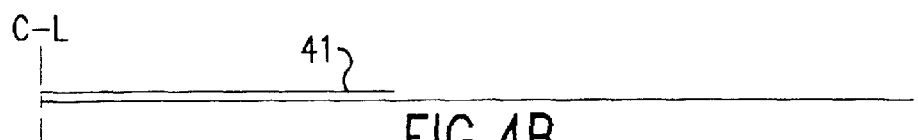
Figure 4C:
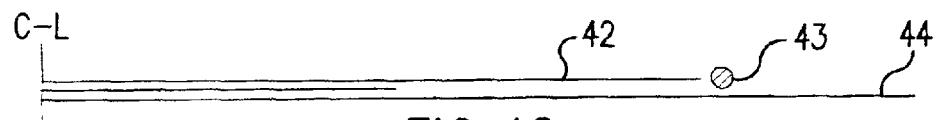

Accordingly as shown in FIG. 4a) firstly a carcass ply 40 comprising axially extending re-forcing cords embedded in rubber is formed into a cylinder. Shown in FIGS. 4b) and 4c) a narrow breaker ply 41 is assembled centrally onto the radially outer surface of the cylindrical carcass ply followed by a wider breaker ply 42 which is fitted over the narrower breaker ply 41.

An annular bead hoop 43 is then fitted around the carcass ply 40 axially inward of the axial outer edge 44 of the ply cylinder 40 and adjacent to the edge of the wide breaker ply 42.

Figure 4D:
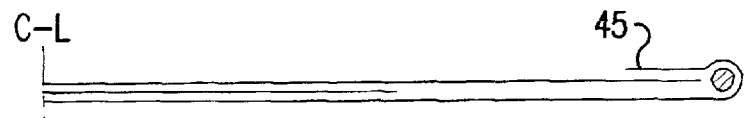

As shown in FIG. 4d) the portion of the ply cylinder lying axially outward of the annular bead hoop 43 is then turned radially outward and axially inwardly to wrap around the bead hoop 43 to form a ply turn-up portion 45 overlying the edge portion of the wide breaker 42.

Figure 4E:
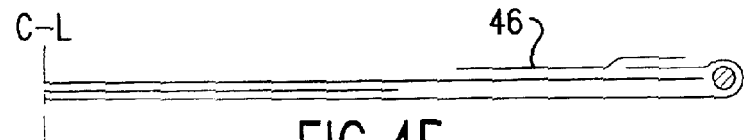
Figure 4F:
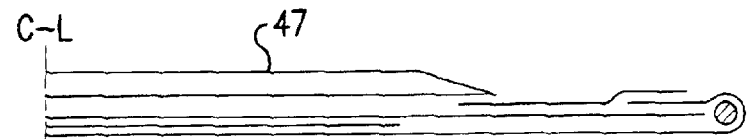

In constructions comprising also a bead apex this may be fitted prior to wrapping the ply around the bead hoop. Remaining components of the tire are then fitted onto the cylindrical assembly including for example a sidewall rubber 46 and a rubber tread strip 47 as shown in FIGS. 4e) and 4f).

Figure 4G:
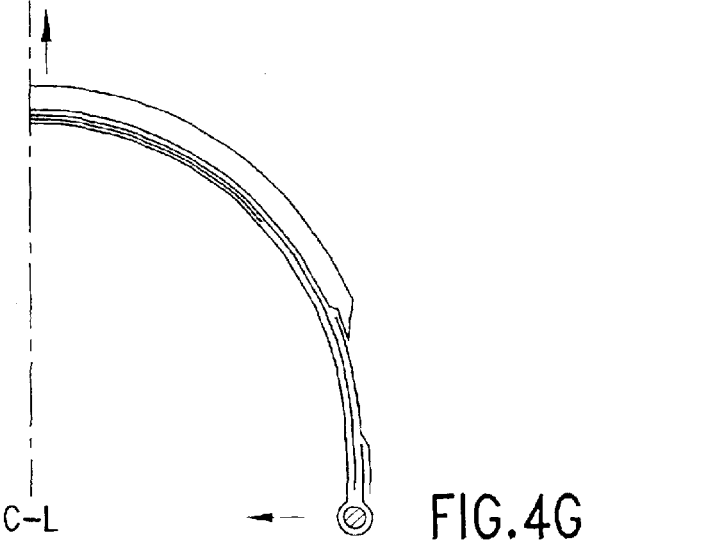

Finally, as shown in FIG. 4g) the cylindrical shape of the assembly is changed into a toroidal shape by simultaneously moving the bead region axially inward and the central crown portion radially outward as indicated by the arrows.

The toroidal shaped assembly is then heated under pressure in a mould to form the tire tread pattern and vulcanize the completed assembly.

In manufacturing the tire of the present invention by a single stage process the inventors have found that the configuration of the wide breaker ply extending into the bead region controls the stretching and trellising of the breaker plies and also influences the distortion of the ply in an unexpected and beneficial manner. Thus whilst the angle of the cords of the breaker plies reduces from for example 30° to the circumferential direction in the cylindrical state to for example 20° in the finished toroidal state, the finished angle of the carcass ply cords also changes.

The magnitude of the angle change of the carcass ply cord is small when the narrowed breaker ply is immediately adjacent to the carcass ply and greater when the wide breaker ply is immediately adjacent, when radial bias angle may change progressively from 90° in the bead regions to approximately 78° or even as low as 70° in the central crown region.

However, regardless of the magnitude of the angle changes of the carcass ply cords, a most surprising effect is that the movement of the carcass ply cords is in the opposed sense to the movement of the cords of the immediately adjacent breaker. The overall effect is therefore for the carcass ply cords to move to increasingly across the adjacent breaker cords and so enlarge the included angle therebetween. This effect is thought to benefit the tire by improving the breaker reinforcing characteristics, particularly where only two breaker plies are present, due to increasing the triangulation between the cords of the two breaker plies and those of the carcass ply.

What is claimed is:

1. A method of fabricating a radial tire, the method comprising:
    a) forming a cylindrical-shaped carcass ply comprising axially extending carcass reinforcing cords;
    b) fitting annular bead hoops onto a radially outer surface of the carcass ply and axially inward of each of the ply edges;
    c) assembling a plurality of breaker plies centrally onto and about the radially outer surface of the carcass ply, the breaker plies comprising a wide breaker ply which extends axially to a position inward of and adjacent to each of the bead hoops;
    d) turning each of the carcass ply edge portions lying axially outwardly of the bead hoops radially outwardly and axially inwardly around the bead hoops to overlie the axial edges of the wide breaker ply;
    e) assembling onto the cylindrical assembly of carcass plies, bead hoops and breaker plies, additional components of the tire, including a centrally disposed rubber tread flanked at either side by rubber sidewalls, to form a cylindrical green tire assembly;
    f) shaping the cylindrical green tire assembly into a toroid; and
    g) molding the cylindrical green tire assembly in a heated tire mould to form the tread pattern in the tread and vulcanize the molded assembly, wherein the radial bias angle of the carcass reinforcing cords in the vulcanized tire changes progressively from 90° in the regions of the bead hoops to as low as 70° in the central crown region.

2. The method as recited in claim 1, wherein at least one of the breaker plies is of smaller axial width than the wide breaker ply, and wherein, during step c), the breaker ply of smaller axial width is disposed between the carcass ply and the wide breaker ply.

3. The method as recited in claim 1, wherein at least one of the breaker plies is of smaller axial width than the wide breaker ply, and wherein, during step c), the wide breaker ply is disposed between the carcass ply and the breaker ply of smaller axial width.

4. The method as recited in claim 1, wherein the breaker plies comprise a plurality of breaker plies of smaller axial width than the wide breaker ply, and wherein, during step c), the wide breaker ply is disposed between the carcass ply and the breaker plies of smaller axial width.

5. The method as recited in claim 1, wherein, prior to step d), a rubber apex of generally triangular cross-section is fitted about the carcass ply axially inward of and adjacent to each of the bead hoops.

6. The method as recited in claim 5, wherein, during step c), the edges of the wide breaker ply are placed over the apexes.

7. The method as recited in claim 5, wherein, during step c), the edges of the wide breaker ply are placed between the carcass ply and the apexes.

8. The method as recited in claim 5, wherein, during step c), the edges of the wide breaker ply are disposed axially inward of the apexes.

9. The method as recited in claim 1, wherein, during step f), axially outer bead regions of the cylindrical green tire assembly are moved axially inward while a central crown region of the cylindrical green tire assembly is moved radially outward.

* * * * *